(12) United States Patent
Tsai (10) Patent No.: US 7,661,816 B2
(45) Date of Patent: Feb. 16, 2010

(54) EYEGLASSES ASSEMBLY (75) Inventor: Po Ju Tsai, Tainan (TW)

(73) Assignee: Jelden Enterprise Co., Ltd., Tainan (TW)

( * ) Notice: Subject to any disclaimer, the term of this patent is extended or adjusted under 35 U.S.C. 154(b) by 0 days.

(21) Appl. No.: 12/039,894

(22) Filed: Feb. 29, 2008

(65) Prior Publication Data
US 2009/0219479 A1 Sep. 3, 2009

(51) Int. Cl.
*G02C 5/14* (2006.01)
(52) U.S. Cl. ........................................ 351/123; 351/156
(58) Field of Classification Search .................. 351/41, 351/44, 47, 48, 57, 58, 62, 103–109, 111–123, 351/124–135, 156–158
See application file for complete search history.

(56) References Cited

U.S. PATENT DOCUMENTS

| | | | |
|---|---|---|---|
| 4,603,951 A * | 8/1986 | Beck et al. | 351/156 |
| 5,428,407 A * | 6/1995 | Sheffield | 351/58 |
| 5,689,835 A * | 11/1997 | Chao | 2/446 |
| 7,396,124 B1 * | 7/2008 | Wang | 351/47 |

\* cited by examiner

*Primary Examiner*—Huy K Mai
(74) *Attorney, Agent, or Firm*—Alan Kamrath; Kamrath & Associates PA (57) ABSTRACT

An eyeglasses assembly comprises a primary lens frame combined with lenses having a primary function, a protective strip, and a secondary lens frame combined with lenses having a secondary function. The protective strip and the secondary lens frame each have a middle section formed with a forwardly protruding, resilient clamp having an opening which is constantly kept closed. The protective strip or the secondary lens frame can be selectively assembled as needed with the primary lens frame by engaging the opening of the resilient clamp of the protective strip or the secondary lens frame with a perimeter of a supporting portion on a middle section of the primary lens frame, wherein the supporting portion has a rear end formed as a bulged segment. Alternatively, the protective strip and the secondary lens frame can both be assembled with the primary lens frame to form the eyeglasses assembly.

3 Claims, 11 Drawing Sheets

EYEGLASSES ASSEMBLY

BACKGROUND OF THE INVENTION

1. Technical Field

The present invention relates to an eyeglasses assembly and, more particularly, to an eyeglasses assembly wherein a primary lens frame can be conveniently and rapidly assembled with or detached from a protective strip and/or a secondary lens frame combined with lenses having a secondary function, and wherein a temple bar attached to each of two sides of the primary lens frame has an end formed with a transversely elliptical through hole for being inserted by a fastener attached to each of two ends of a strap, so that the strap is stably positioned with the temple bars, in which each of the two temple bars further has a soft engaging portion on an inner side thereof adjacent to an ear-side supporting section of said temple bar, so that the eyeglasses assembly can be comfortably worn.

2. Description of Related Art

A variety of eyeglasses assemblies have been developed for vision correction or eye protection. In some cases, a protective strip or a secondary lens frame combined with lenses having a secondary function is formed at acting ends thereof with a plurality of engaging portions for engagement with a primary lens frame. In some other cases, a fastener attached to each of two ends of a strap can be fittingly engaged with an acting end of a temple bar attached to each of two sides of the primary lens frame. When the strap is no more needed, the fasteners can be detached from the respective acting ends of the temple bars by using a slight force. However, for the aforementioned eyeglasses assemblies, the primary lens frame cannot be assembled with the protective strip or the secondary lens frame without a plurality of fastening portions formed on the frames and the strip. As a result, components of the aforementioned eyeglasses assemblies are more difficult to be processed and cannot be conveniently assembled or disassembled.

SUMMARY OF THE INVENTION

In view of the inconvenience of existing eyeglasses assemblies in component processing and assembly, the present invention provides a novel design for an eyeglasses assembly in which a primary lens frame can be conveniently and rapidly assembled with or detached from a protective strip or a secondary lens frame combined with lenses having a secondary function, and in which a temple bar attached to each of two sides of the primary lens frame can be rapidly inserted by a fastener attached to each of two ends of a strap, so that the strap is fastened to and stably positioned with the temple bars, wherein the temple bars are also designed to be comfortably worn.

Therefore, a primary objective of the present invention is to provide an eyeglasses assembly comprising a primary lens frame combined with lenses having a primary function, a protective strip attachable to the primary lens frame and a secondary lens frame combined with lenses having a secondary function, wherein the protective strip and the secondary lens frame each have a middle section formed with a forwardly protruding, resilient clamp having an opening which is constantly kept closed. The protective strip or the secondary lens frame can be selectively assembled as needed with the primary lens frame by bringing the opening of the resilient clamp protruding from the middle section of the protective strip or the secondary lens frame into engagement with a perimeter of a supporting portion formed on a middle section of the primary lens frame, wherein the supporting portion has a rear end formed as a bulged segment. Alternatively, the protective strip and the secondary lens frame can both be assembled with the primary lens frame to form the eyeglasses assembly.

A second objective of the present invention is to provide an eyeglasses assembly comprising a primary lens frame combined with lenses having a primary function, two temple bars to be supported around a user's ears and a strap fastened between the two temple bars, wherein each of the temple bars attached respectively to two sides of the primary lens frame has an end formed with a transversely elliptical through hole for being inserted by an outward protrusion formed on a fastener attached to each of two ends of the strap, so that the strap is stably positioned with the temple bars after the protrusions are pulled backwards. Furthermore, each of the two temple bars has a soft engaging portion on an inner side thereof adjacent to an ear-side supporting section of said temple bar, wherein the soft engaging portion is spaced from said temple bar by a spacing, so that the temple bars make comfortable contact with the user when the eyeglasses assembly is in use.

BRIEF DESCRIPTION OF THE DRAWINGS

The invention as well as a preferred mode of use, further objectives and advantages thereof will best be understood by reference to the following detailed description of illustrative embodiments when read in conjunction with the accompanying drawings, wherein.

DETAILED DESCRIPTION OF THE PREFERRED EMBODIMENT

Figure 1:
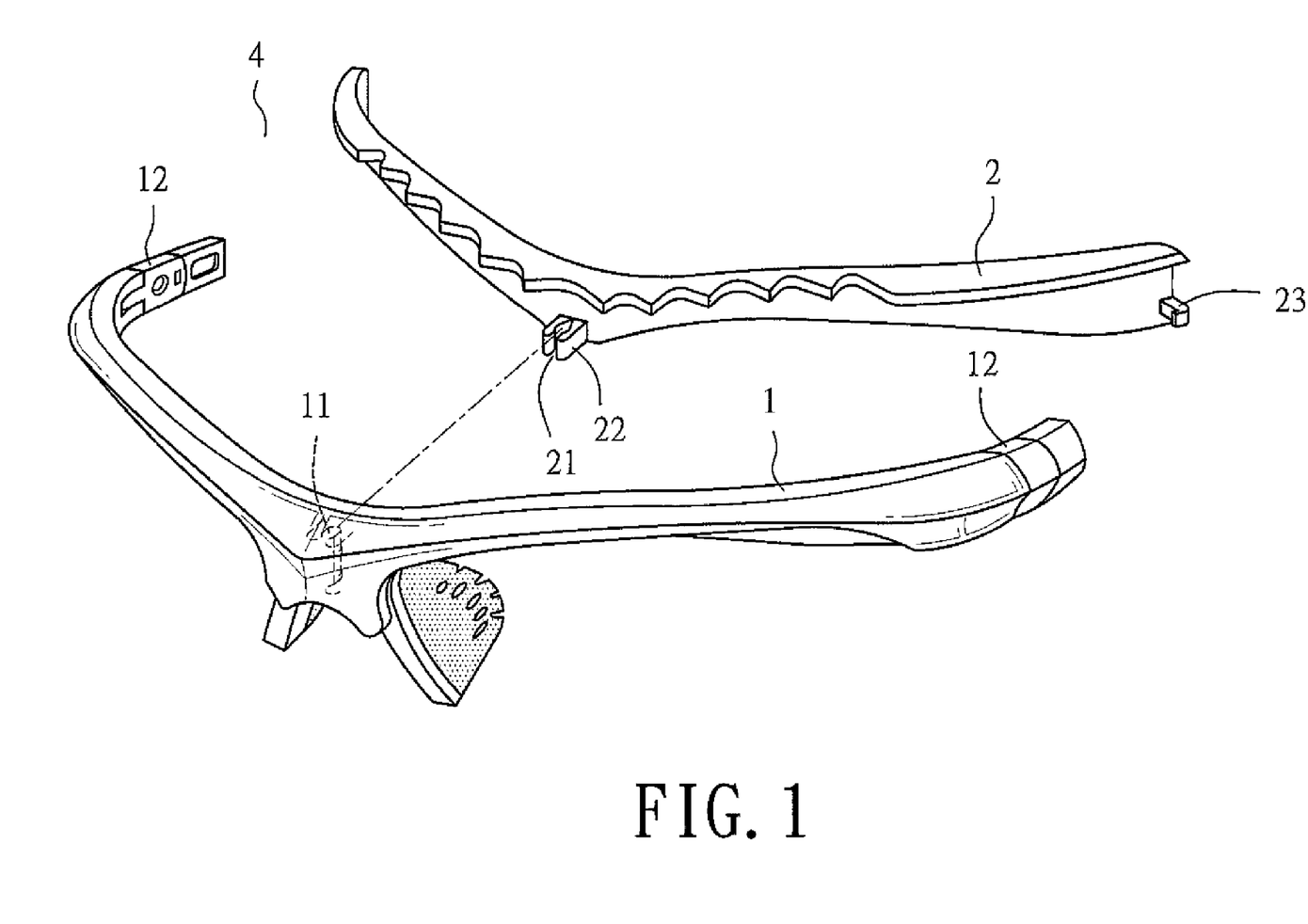
FIG. 1 is a perspective exploded view of an eyeglasses assembly according to a first embodiment of the present invention.

Referring to FIG. 1, an eyeglasses assembly 4 according to a first embodiment of the present invention comprises a lens frame 1 and a protective strip 2. The lens frame 1 has a middle section formed with a supporting portion 11 which has a rear end formed as a bulged segment. The lens frame 1 further has a temple bar connecting section 12 pivotally connected to each of two sides thereof. The protective strip 2 is a slightly resilient component shaped according to a shape of the lens frame 1 and comprises a middle section formed with a forwardly protruding, resilient clamp 22 having an opening 21 which is constantly kept closed. The protective strip 2 further comprises a hook 23 forwardly protruding from each of two sides thereof for being connected with a recess formed on a corresponding inner portion of the lens frame 1, so that the position of the protective strip 2 can be retained.

Figure 2:
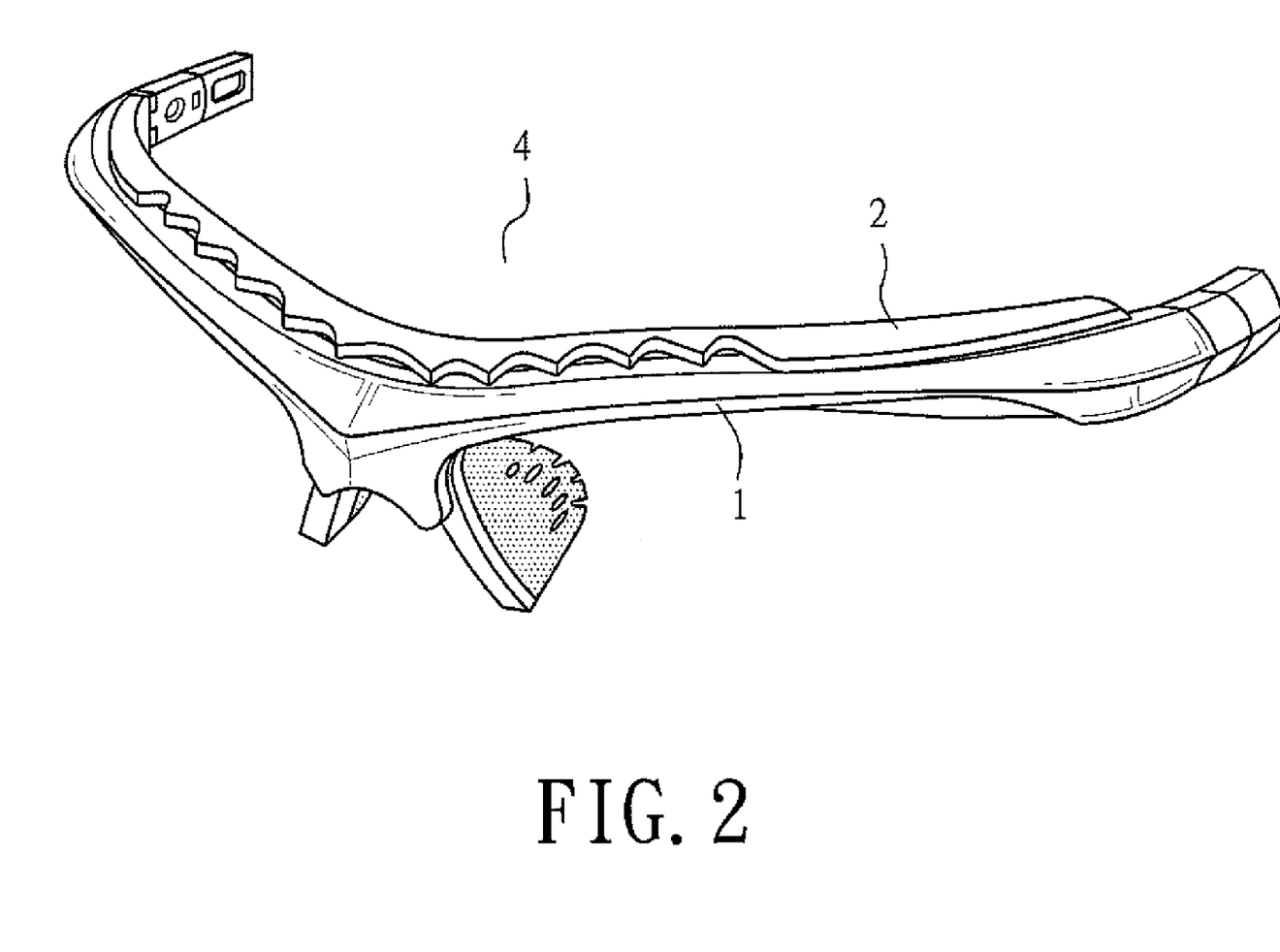
FIG. 2 is an assembled view of the eyeglasses assembly according to the first embodiment of the present invention.
Figure 3:
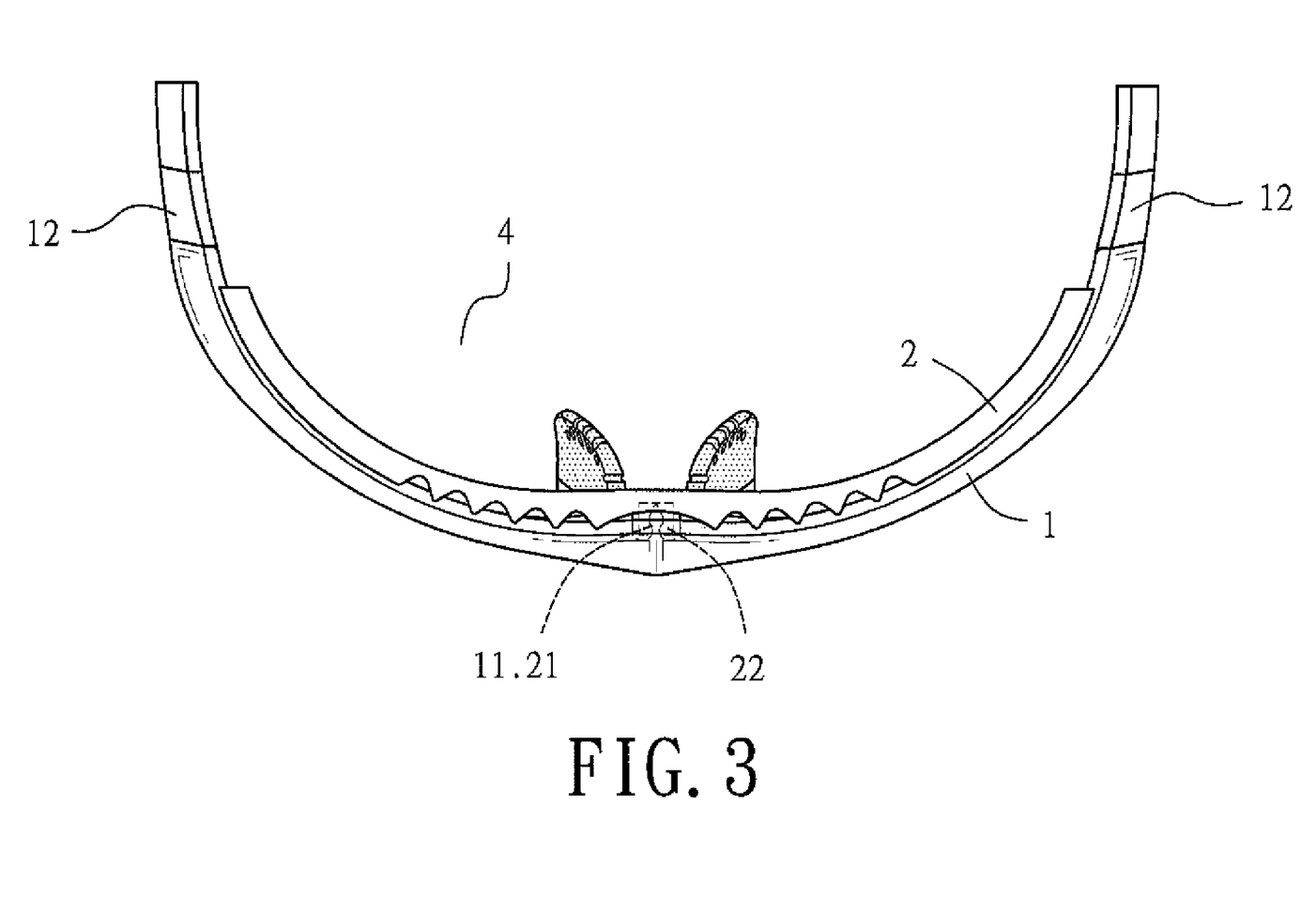
FIG. 3 is a schematic, assembled top view of the eyeglasses assembly according to the first embodiment of the present invention.

Referring to FIG. 3, when the lens frame 1 is to be assembled with the protective strip 2, the opening 21 of the resilient clamp 22 protruding from the middle section of the protective strip 2 is engaged with a perimeter of the supporting portion 11 formed on the middle section of the lens frame 1, and then the hooks 23 protruding from the two sides of the protective strip 2 are engaged in the recesses formed on the corresponding inner portions of the lens frame 1. (The latter engagement between the hooks 23 and the recesses is a known design and therefore not depicted in the drawing.) Thus, the protective strip 2 and the lens frame 1 can be conveniently and rapidly assembled and stably positioned with each other, as shown in FIG. 2. When it is desired to detach the protective strip 2 from the lens frame 1, it can be done in a simple operation while maintaining the integrity of both the protective strip 2 and the lens frame 1.

Figure 4:
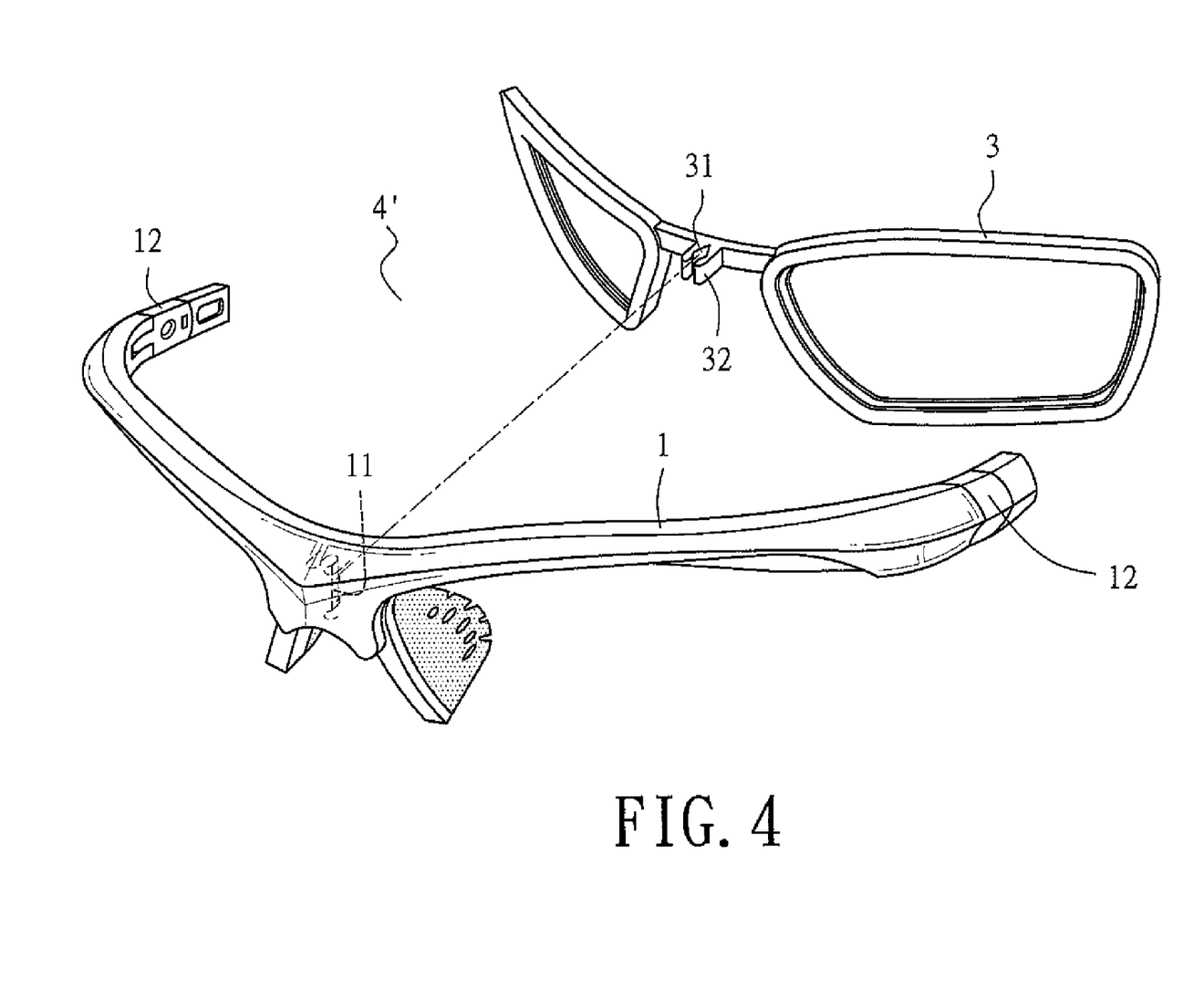
FIG. 4 is a perspective exploded view of an eyeglasses assembly according to a second embodiment of the present invention.

Referring to FIG. 4, an eyeglasses assembly 4' according to a second embodiment of the present invention comprises a primary lens frame 1 and a secondary lens frame 3 combined with lenses having a secondary function. The primary lens frame 1 is similar to the lens frame 1 in the first embodiment of the present invention in having a middle section formed with a supporting portion 11 which has a rear end formed as a bulged segment, and in further having a temple bar connecting section 12 pivotally connected to each of two sides of the primary lens frame 1.

The secondary lens frame 3 comprises a frame cavity on each of two sides thereof for accommodating the lenses having the secondary function. The secondary lens frame 3 further comprises a middle section formed with a forwardly protruding, resilient clamp 32 having an opening 31 which is constantly kept closed.

Figure 5:
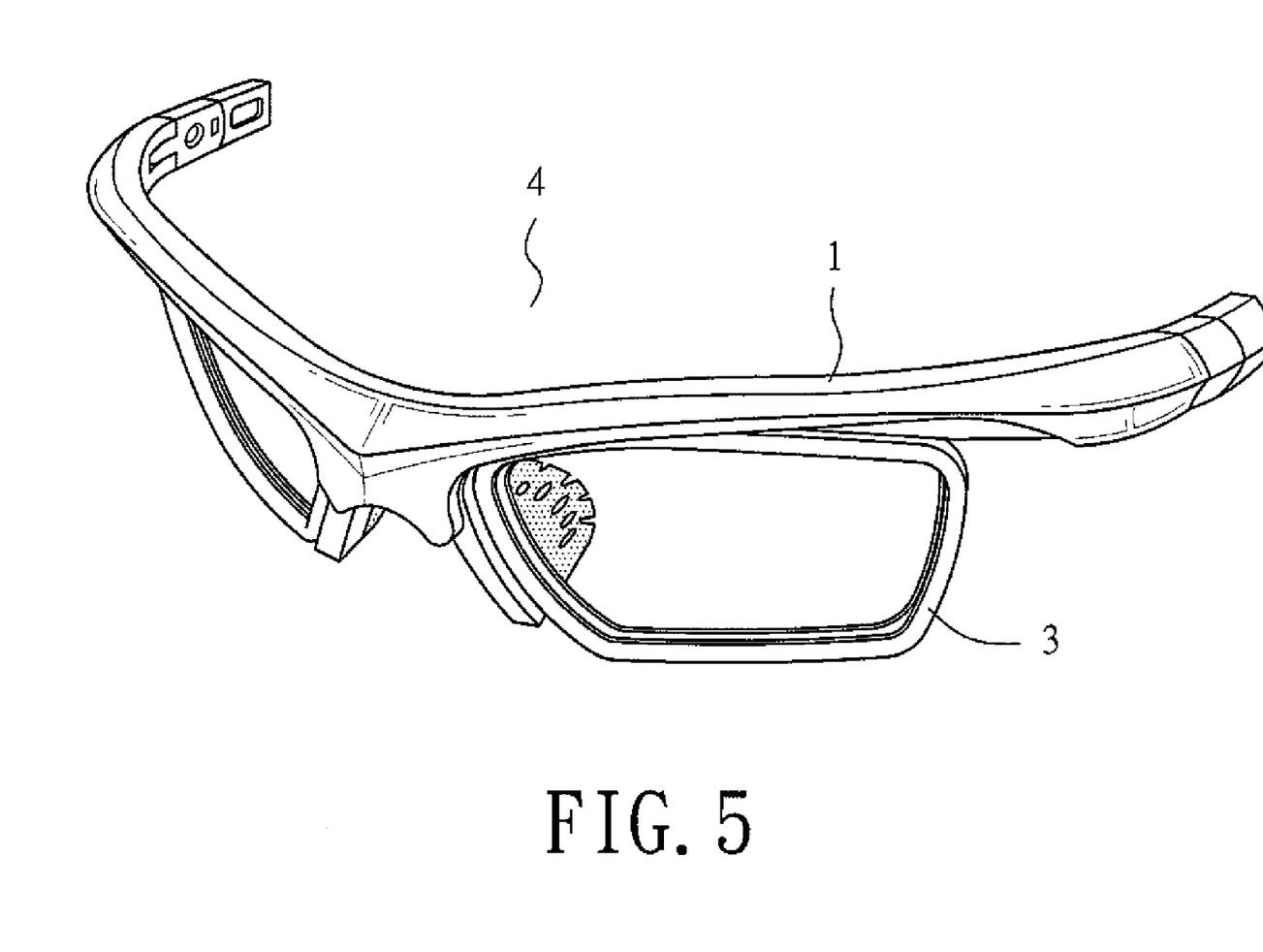
FIG. 5 is an assembled view of the eyeglasses assembly according to the second embodiment of the present invention.
Figure 6:
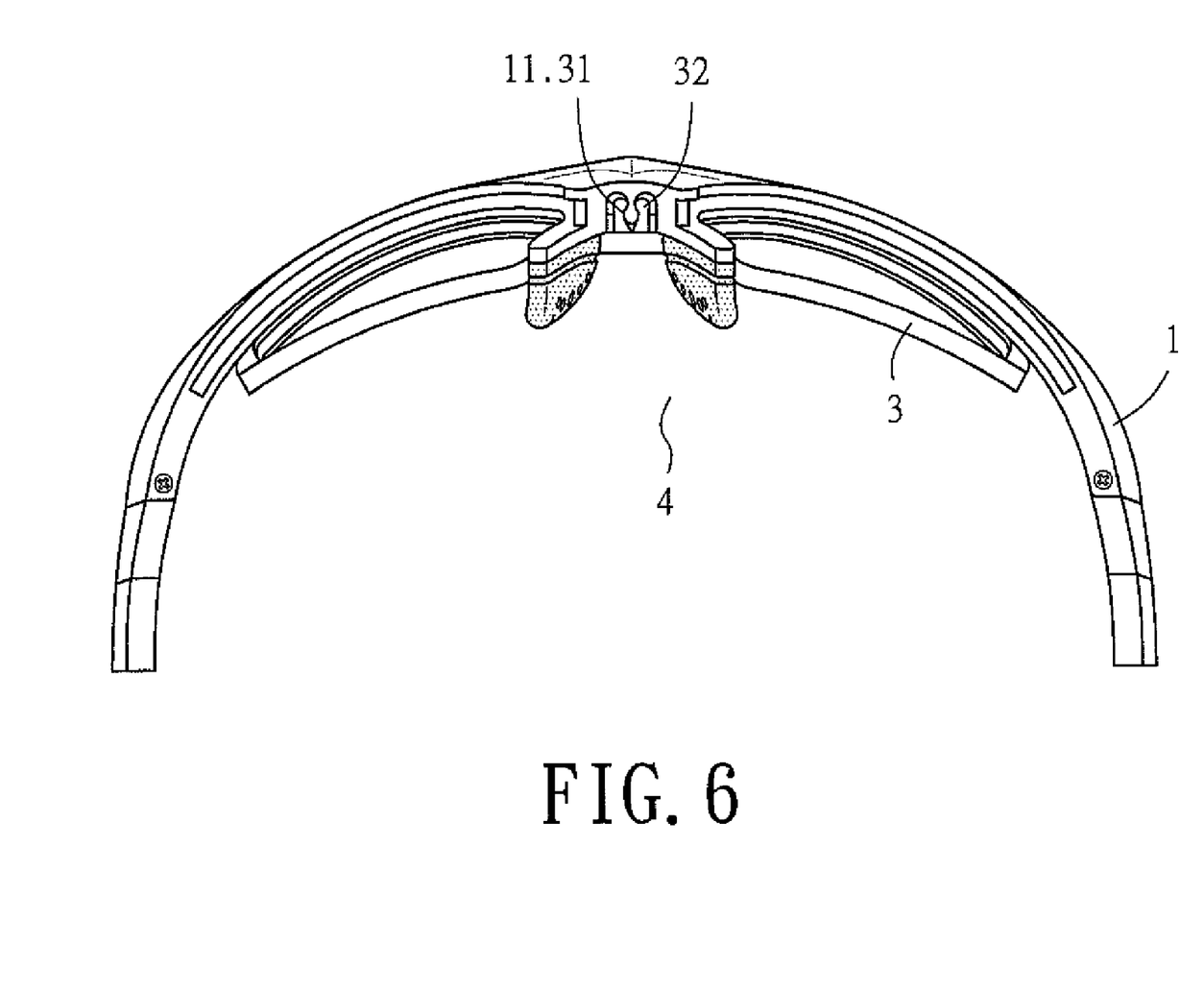
FIG. 6 is a schematic, assembled bottom view of the eyeglasses assembly according to the second embodiment of the present invention.

Referring to FIG. 6, during assembly of the primary lens frame 1 and the secondary lens frame 3, the opening 31 of the resilient clamp 32 protruding from the middle section of the secondary lens frame 3 is engaged with a perimeter of the supporting portion 11 formed on the middle section of the primary lens frame 1. Thus, the secondary lens frame 3 is conveniently and rapidly assembled with the primary lens frame 1 and stably positioned therewith, as shown in FIG. 5. When it is desired to detach the secondary lens frame 3 from the primary lens frame 1, it can be done in a simple operation while maintaining the integrity of both of the frames 1 and 3.

Figure 7:
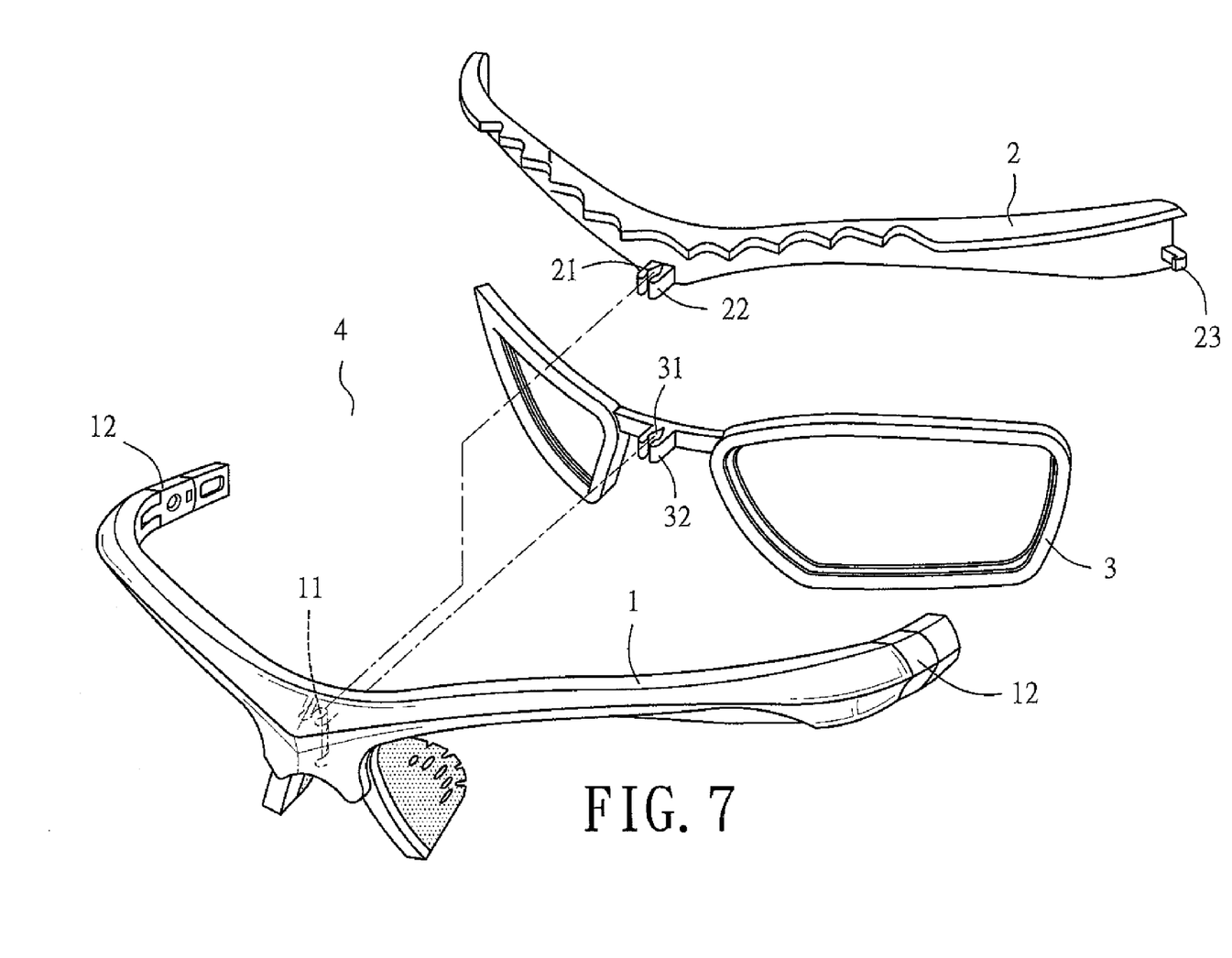
FIG. 7 is a perspective exploded view of an eyeglasses assembly according to a third embodiment of the present invention.

FIG. 7 illustrates an eyeglasses assembly 4" according to a third embodiment of the present invention, wherein the eyeglasses assembly 4" comprises a primary lens frame 1, a protective strip 2 and a secondary lens frame 3 combined with lenses having a secondary function.

Similar to the lens frame 1 in the first embodiment of the present invention, the primary lens frame 1 in the third embodiment also has a middle section formed with a supporting portion 11 which has a rear end formed as a bulged segment, and a temple bar connecting section 12 pivotally connected to each of two sides of the primary lens frame 1.

The protective strip 2 in the third embodiment of the present invention is also similar to that in the first embodiment in being a slightly resilient component shaped in accordance with a shape of the primary lens frame 1, in comprising a middle section formed with a forwardly protruding, resilient clamp 22 having an opening 21 which is constantly kept closed, and in further comprising a hook 23 forwardly protruding from each of two sides of the protective strip 2 for being engaged in a recess formed on a corresponding inner portion of the primary lens frame 1 so as to retain the position of the protective strip 2.

The secondary lens frame 3 in the third embodiment is similar to its counterpart in the second embodiment in comprising a frame cavity on each of two sides thereof for accommodating the lenses having the secondary function, and in further comprising a middle section formed with a forwardly protruding, resilient clamp 32 having an opening 31 which is constantly kept closed.

Figure 8:
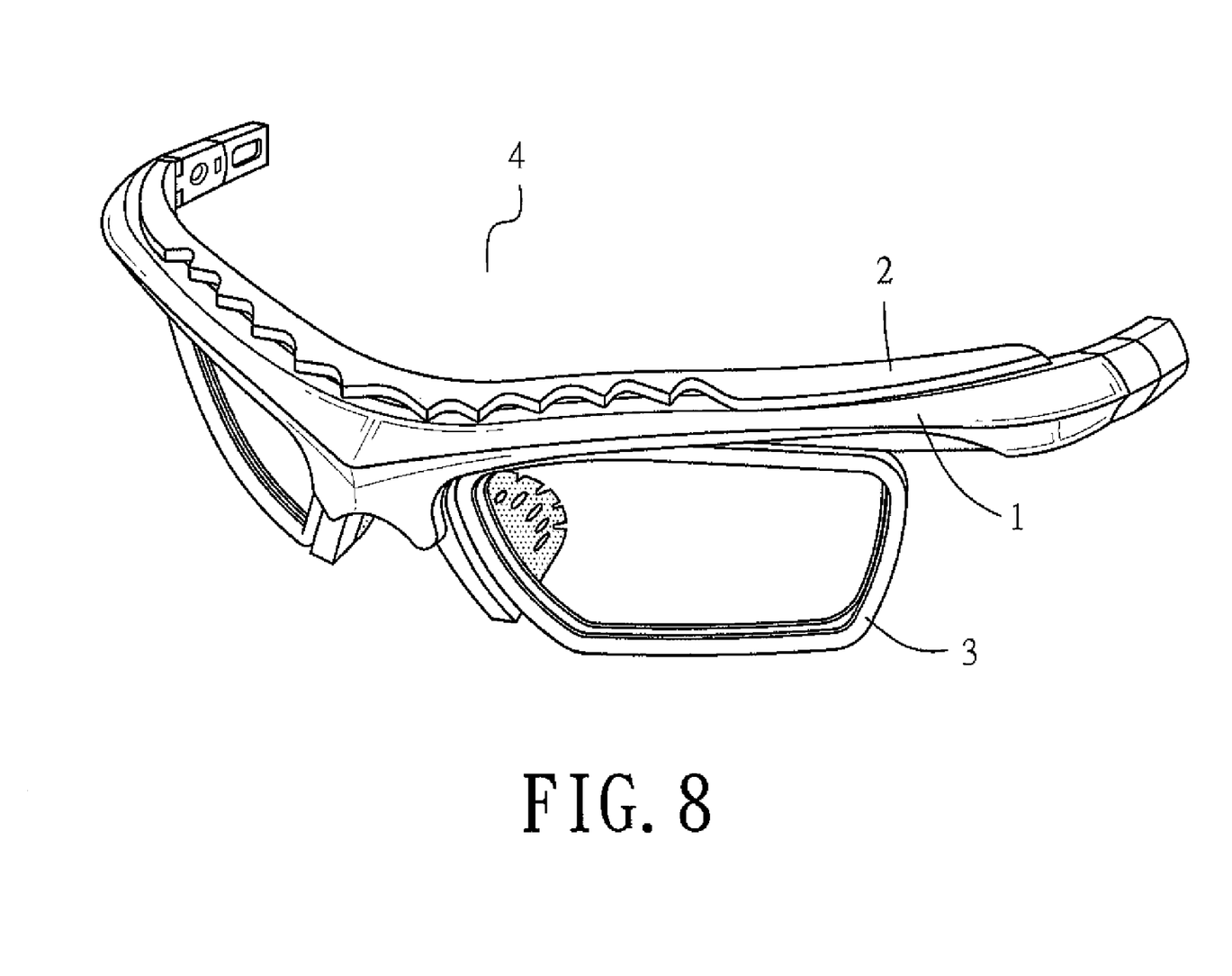
FIG. 8 is an assembled view of the eyeglasses assembly according to the third embodiment of the present invention.

Referring to FIG. 8, in order to assemble the primary lens frame 1, the protective strip 2 and the secondary lens frame 3, the opening 21 of the resilient clamp 22 protruding from the middle section of the protective strip 2 is engaged with an upper portion of a perimeter of the supporting portion 11 formed on the middle section of the primary lens frame 1 (referring also to FIG. 3). Then, the hooks 23 protruding from the two sides of the protective strip 2 are engaged in the recesses (not shown in the drawings) formed on the corresponding inner portions of the primary lens frame 1. Next, the opening 31 of the resilient clamp 32 protruding from the middle section of the secondary lens frame 3 is engaged with a lower portion of the perimeter of the supporting portion 11 formed on the middle section of the primary lens frame 1 (referring also to FIG. 6). Thus, the primary lens frame 1 can be selectively assembled as needed with the protective strip 2 or the secondary lens frame combined with the lenses having the secondary function, into a configuration shown in FIG. 2 or 5. Alternatively, the protective strip 2 and the secondary lens frame 3 combined with the lenses having the secondary function can be both assembled with the primary lens frame 1 to form the eyeglasses assembly 4", as shown in FIG. 8.

Figure 9:
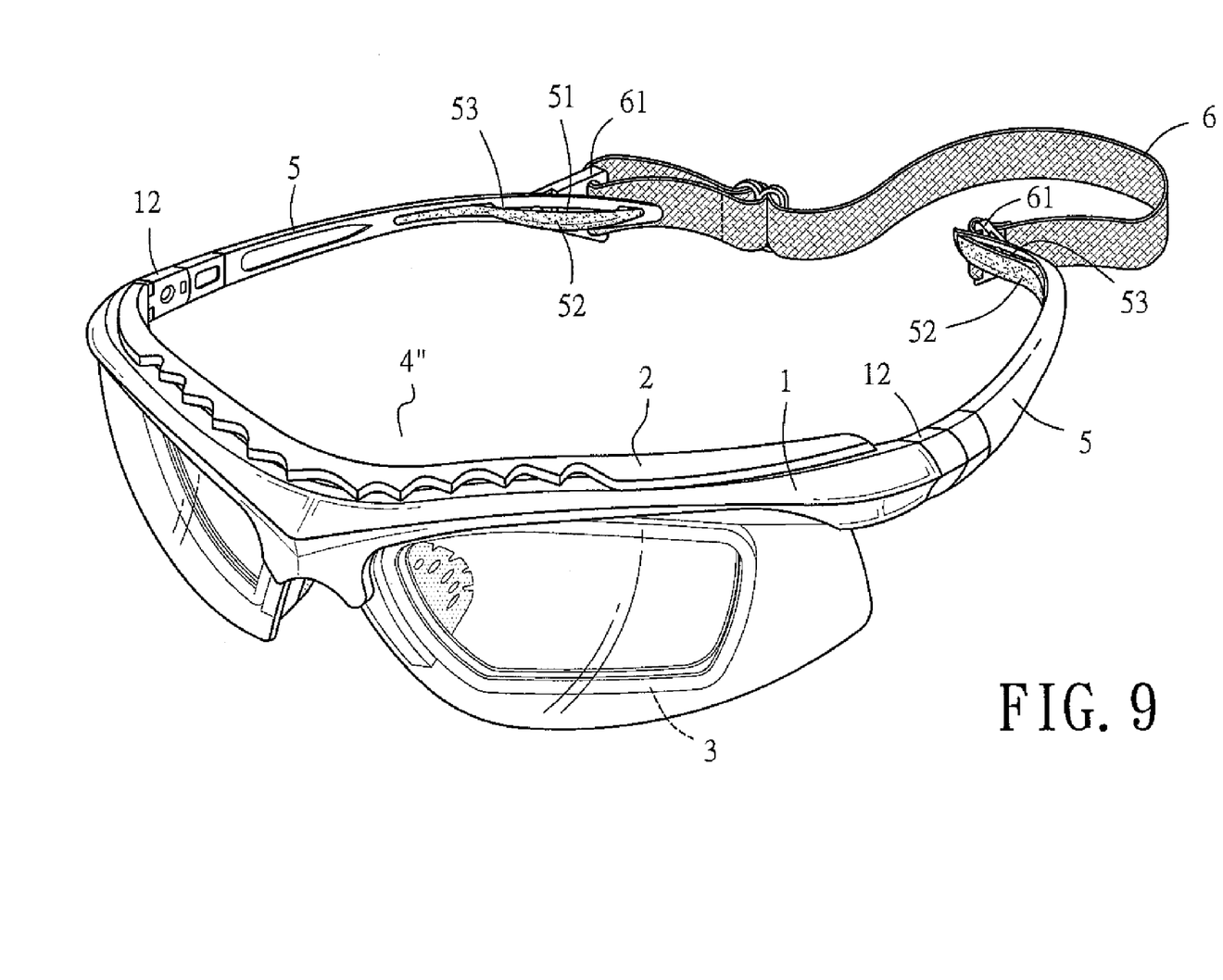
FIG. 9 an assembled view of an eyeglasses assembly according to a fourth embodiment of the present invention.

FIG. 9 illustrates an eyeglasses assembly according to a fourth embodiment of the present invention, wherein the eyeglasses assembly comprises a sub-assembly of a primary lens frame 1. The sub-assembly combined with lenses having a primary function (such as the eyeglasses assembly 4" in FIG. 8), temple bars 5 for being supported around a user's ears and a strap 6 fastened between the two temple bars 5.

The temple bars 5 are attached to two sides of the sub-assembly of the primary lens frame 1, respectively. Each of the temple bars 5 has an end formed with a transversely elliptical through hole 51 as shown in FIG. 10, and a soft engaging portion 52 formed on an inner side thereof adjacent to an ear-side supporting section of said temple bar 5, wherein the soft engaging portion 52 is spaced from said temple bar 5 by a spacing 53.

The strap 6 has two ends, each of which is attached with a fastener 61. Each of the fasteners 61 is formed with an outward protrusion 62 having a boundary section 621 formed at a distal end thereof.

Figure 10:
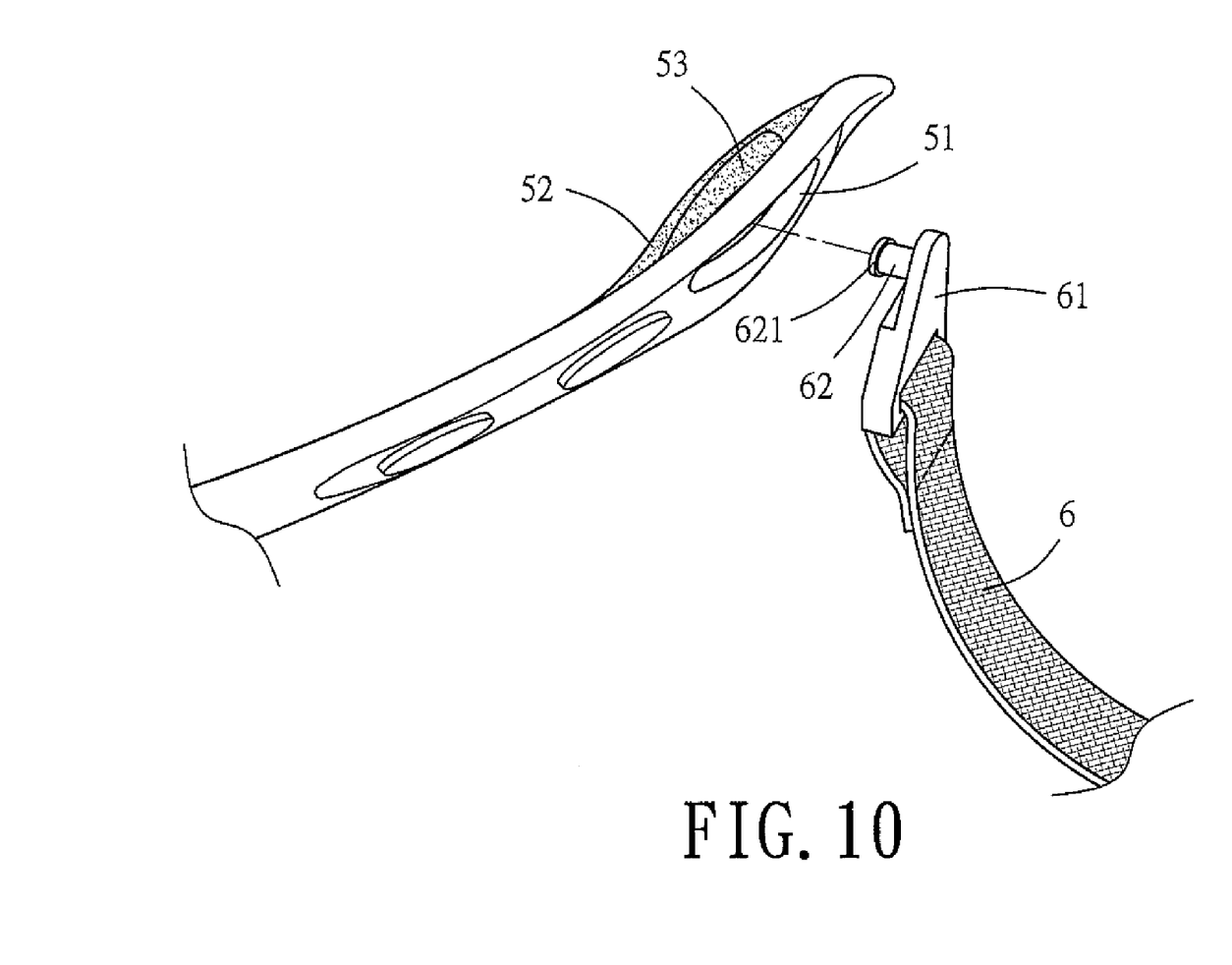
FIG. 10 is a partial, exploded view of the eyeglasses assembly according to the fourth embodiment of the present invention.
Figure 11:
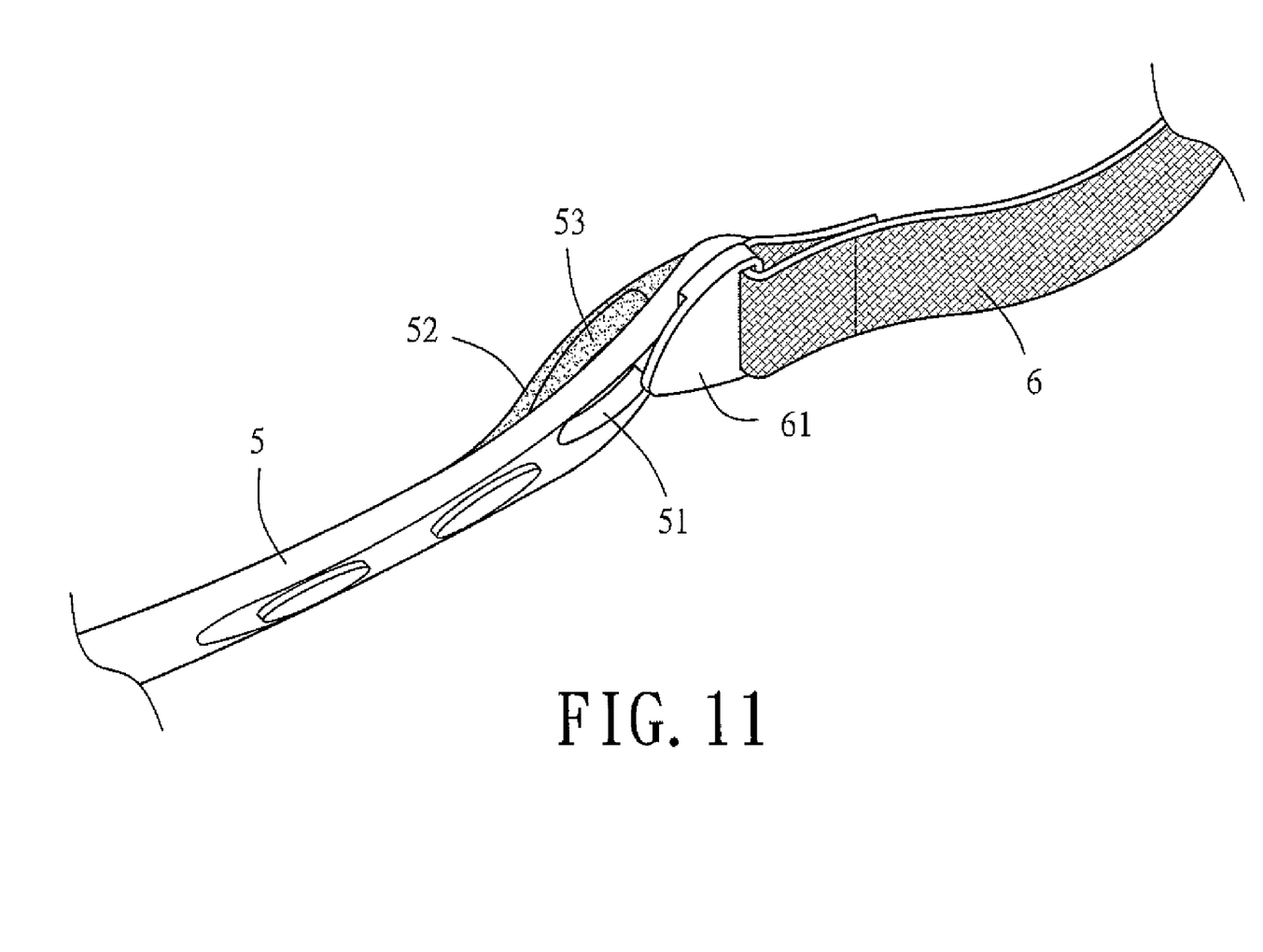
FIG. 11 is a partial, assembled view of the eyeglasses assembly according to the fourth embodiment of the present invention.

As shown in FIG. 10, when the temple bars 5 attached to the two sides of the primary lens frame 1 are to be assembled with the strap 6, the outward protrusion 62 having the boundary sections 621 and formed on the fasteners 61 attached to the two ends of the strap 6 are inserted into the transversely elliptical through holes 51 on the temple bars 5, respectively, and then pulled backwards, so that each of the protrusions 62 formed on the two fasteners 61 of the strap 6 is securely retained by a narrower section formed at an end of a corresponding said through hole 51, as shown in FIG. 11. Furthermore, because the soft engaging portions 52 are provided on the inner sides of the two temple bars 5 adjacent to the ear-side supporting sections of the temple bars 5 and are spaced from the respective adjacent temple bars 5 by the spacing 53, so that the temple bars 5 can make comfortable contact with the user's face when the eyeglasses assembly is in use, as shown in FIG. 9.

What is claimed is:

1. An eyeglasses assembly comprising:
    a primary lens frame combined with lenses having a primary function, two temple bars attached respectively to two sides of the primary lens frame for being supported around a user's ears and a strap fastened between the two temple bars, with:
    each of the temple bars having an end formed with a through hole with a tapered corner on each of two lateral sides thereof, so that an outward protrusion formed on a fastener attached to each of two ends of the strap can be inserted into a corresponding said through hole and be stably positioned therewith after being pulled backwards; and
    each of the two temple bars further comprising a soft engaging portion on an inner side thereof adjacent to an ear-side supporting section of said temple bar, wherein the soft engaging portion is spaced from an adjacent side surface of said temple bar by a spacing, so that the temple bars make comfortable contact with the user's face when the eyeglasses assembly is in use.

2. The eyeglasses assembly as claimed in claim 1, wherein the through holes formed on the respective ends of the two temple bars have a transversely elliptical shape.

3. The eyeglasses assembly as claimed in claim 1, wherein each of the outward protrusions formed on the respective fastener attached to one of the two ends of the strap has a boundary section formed at a distal end thereof, so that the protrusions can be securely retained after being inserted into the through holes formed at the respective ends of the two temple bars.

* * * * *